United States Patent [19]
Diepens

[11] Patent Number: 5,417,763
[45] Date of Patent: May 23, 1995

[54] DEVICE FOR APPLYING A LACQUER COATING TO A DISC-SHAPED REGISTRATION CARRIER

[75] Inventor: Petrus J. F. Diepens, Son, Netherlands

[73] Assignee: OD & ME B.V., Eindhoven, Netherlands

[21] Appl. No.: 138,222

[22] Filed: Oct. 20, 1993

[30] Foreign Application Priority Data

Oct. 21, 1992 [NL] Netherlands ............... 9201824

[51] Int. Cl.⁶ ............................................. B05C 5/00
[52] U.S. Cl. ................................. 118/320; 118/321; 118/323
[58] Field of Search ............... 118/210, 232, 320, 321, 118/323

[56] References Cited

U.S. PATENT DOCUMENTS

| | | | |
|---|---|---|---|
| 3,537,425 | 11/1970 | David et al. | 118/321 |
| 3,724,417 | 4/1973 | MacManus | 118/321 |
| 4,033,288 | 7/1977 | Woelhaf et al. | 118/321 |
| 4,276,333 | 6/1981 | Cobean | 118/321 |

*Primary Examiner*—James C. Housel
*Assistant Examiner*—Rachel Heather Freed
*Attorney, Agent, or Firm*—Cushman Darby & Cushman

[57] ABSTRACT

A device for applying a lacquer coating to a disc-shaped registration carrier. The device includes a rotary table, to be rotated about an axis of rotation at different speeds, for supporting the registration carrier, as well as with an arm which is pivotable about a pivot axis. The arm has a lacquer supply nozzle at one end and the arm is pivotable between a first position near the axis of rotation of the rotary table and a second position beside the rotary table. The arm is mounted and arranged to be pivotable about an upwardly sloping pivot axis so that the pivot axis of the arm and the axis of rotation of the rotary table intersect or cross at a pint higher than the rotary table.

6 Claims, 3 Drawing Sheets 5,417,763

DEVICE FOR APPLYING A LACQUER COATING TO A DISC-SHAPED REGISTRATION CARRIER

A device for applying a lacquer coating to a disc-shaped registration carrier.

FIELD OF THE INVENTION

The present invention relates to a device for applying a lacquer coating to a disc-shaped registration carrier. The device includes a rotary table for rotatably supporting the registration carrier, as well as an arm which is pivotable about a pivot axis, said arm supporting a lacquer supply nozzle and being pivotable between a first position near an axis of rotation of the rotary table and a second position adjacent the rotary table.

BACKGROUND OF INVENTION

In order to apply a lacquer coating a desired quantity of lacquer is usually provided by a supply nozzle supported by a pivotable arm. A registration carrier is supported on a rotary table which is slowly rotated whilst the lacquer is being supplied. A bead of lacquer extending concentrically about the centre and spaced by some distance therefrom, is applied to the registration carrier. Usually, in order to obtain an accurate positioning, the arm is first pivoted in a horzontal plane to a position above the registration carrier, and then the arm is moved downwards, so that the supply nozzle is located a desired short distance above the registration carrier.

After a bead of lacquer has thus been deposited on the registration carrier, the pivotable arm is first raised vertically and then pivoted in a horizontal plane to a position beside the registration carrier. Then the registration carrier is transferred to a rotary table disposed in a further station, in order to be rotated at a high number of revolutions which causes the bead of lacquer to be spread over the surface of the disc from the centre of the disc.

Of course the use of two rotary tables makes the machine more voluminous, makes the process more complicated and a larger number of parts will be required.

SUMMARY OF THE INVENTION

The object of the invention is to obtain a more compact construction of the device for applying a lacquer coating more efficiently and in less time.

According to the invention this can be achieved in that the arm is pivotable about an upwardly sloping pivot axis, which extends in such a manner, that the pivot axis and the axis of rotation of the rotary table intersect or cross at a point higher than the rotary table, and the rotary table can be driven at different speeds.

Due to the sloping position of the pivot axis for the pivotable arm supporting the supply nozzle for the lacquer, the end of the supply nozzle directed towards the rotary table will move downwards simultaneously with the pivoting of the arm from its position beside the rotary table to an operating position above the rotary table. It is thus possible to refrain from supply nozzle movement in a horizontal direction as well as from movement in a vertical direction. The supply nozzle can be pivoted between the non-operating position, the operating position and back again in a optimally short time, using simple means, along a path which includes an angle with the horizontal plane of the rotary table.

A correct selection of the driving means will furthermore make it possible to rotate the rotary table at a comparitively low number of revolutions in order to provide the bead of lacquer, and subsequently to rotate the rotary table a high speed in order to spread the lacquer over the disc-shaped registration carrier.

The device according to the invention will, for example, be particularly suitable for being incorporated in the device described in the applicant's prior Dutch patent application no. 9201065, but of course it will also be possible to use it as a separate unit or in combination with other equipment.

BRIEF DESCRIPTION OF THE DRAWINGS

The invention will be explained in more detail hereafter with reference to an embodiment of the construction according to the invention illustrated in the accompanying figures.

DETAILED DESCRIPTION OF THE PREFERRED EMBODIMENT OF THE INVENTION

Figure 1:
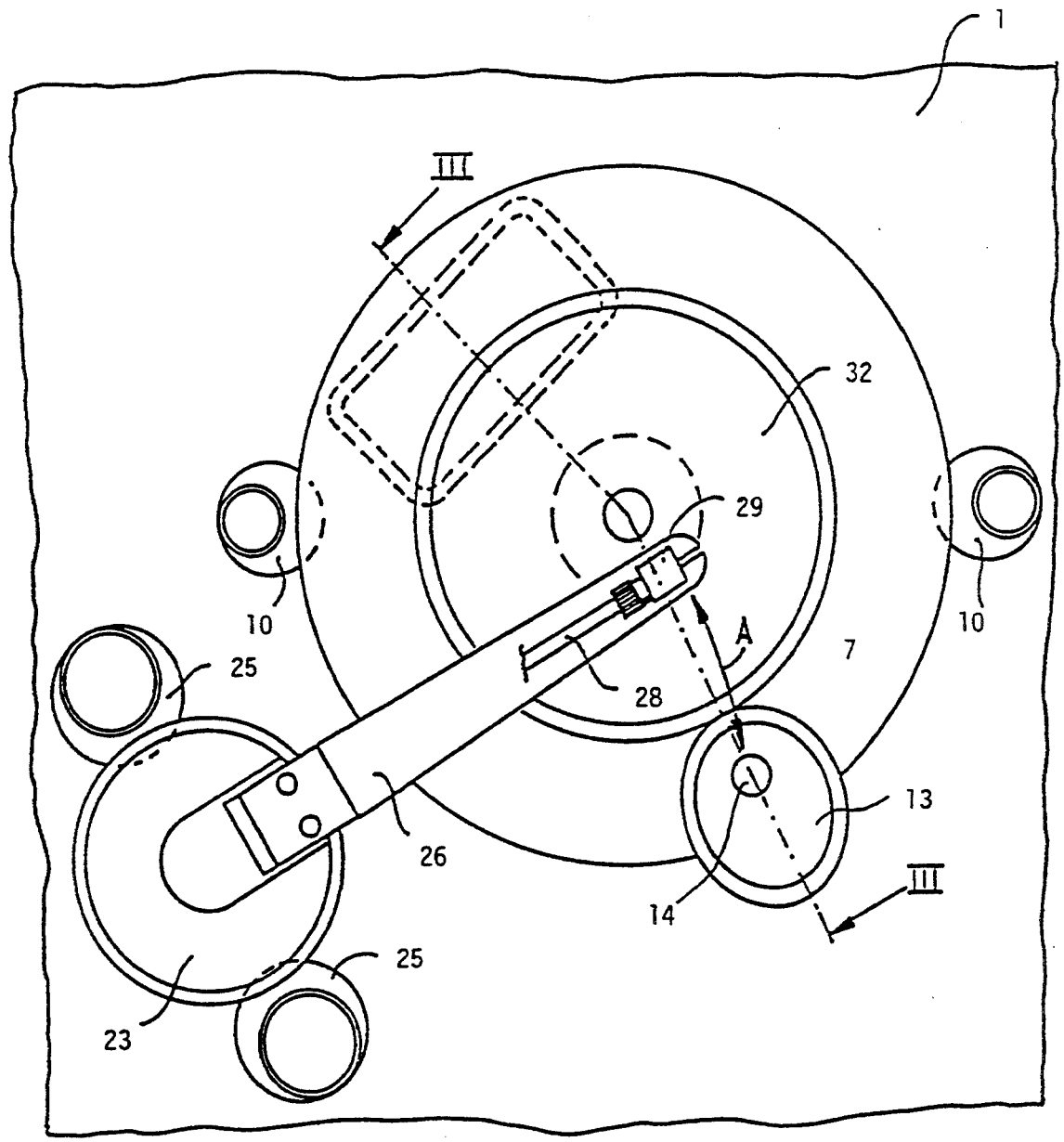
FIG. 1 is a top plan view of the device according to the invention.
Figure 3:
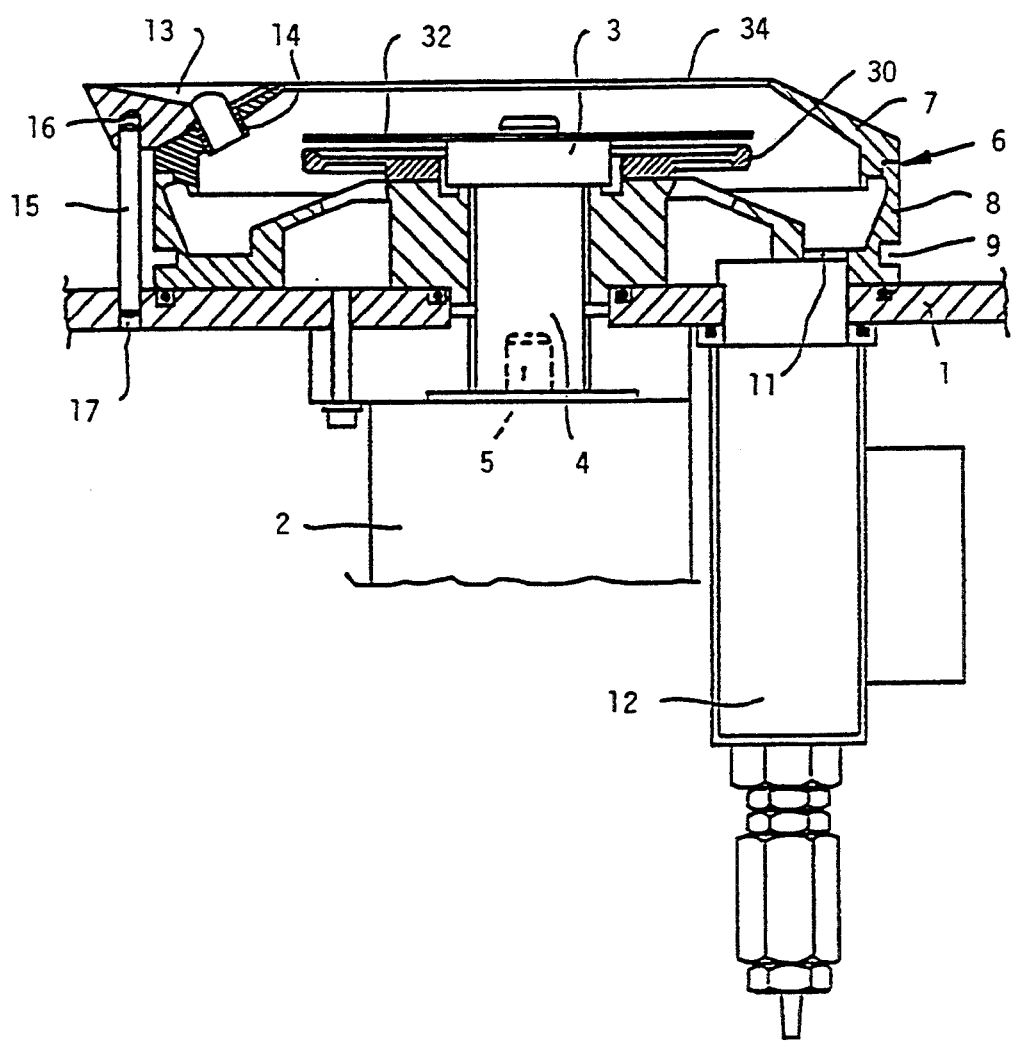
FIG. 3 is a cross sectional view of the device according to the invention, along the line III—III in FIG. 1, wherein selected parts have been omitted for clarity.

Turning attention first to FIGS. 1 and 3 the device comprises a horizontally disposed frame plate 1, to which a driving mechanism 2 is suitably secured. The driving mechanism 2 is intended for rotating a rotary table 3 about a vertical axis of rotation. The rotary table 3 is secured to the upper end of a vertical shaft 4, which is coupled to the driving mechanism 2 by means of a quick action coupling 5 (only diagrammatically indicated) so as to be easily detachable.

The rotary table 3 is integral with a plate-shaped means 30 secured thereto. The rotary table 3 with the plate-shaped means 30 connected thereto function to support a disc-shaped registration carrier 32, such as sound and/or picture carriers and/or data carriers or the like, for example so-called compact discs, or carriers to be processed at a later stage for storing sound, image or other data to be registered thereon.

The registration carrier 32 can be placed on the rotary table 3 and be removed therefrom by means not shown, for example as described in the applicant's prior Dutch patent application no. 9201065 mentioned above.

Figure 2:
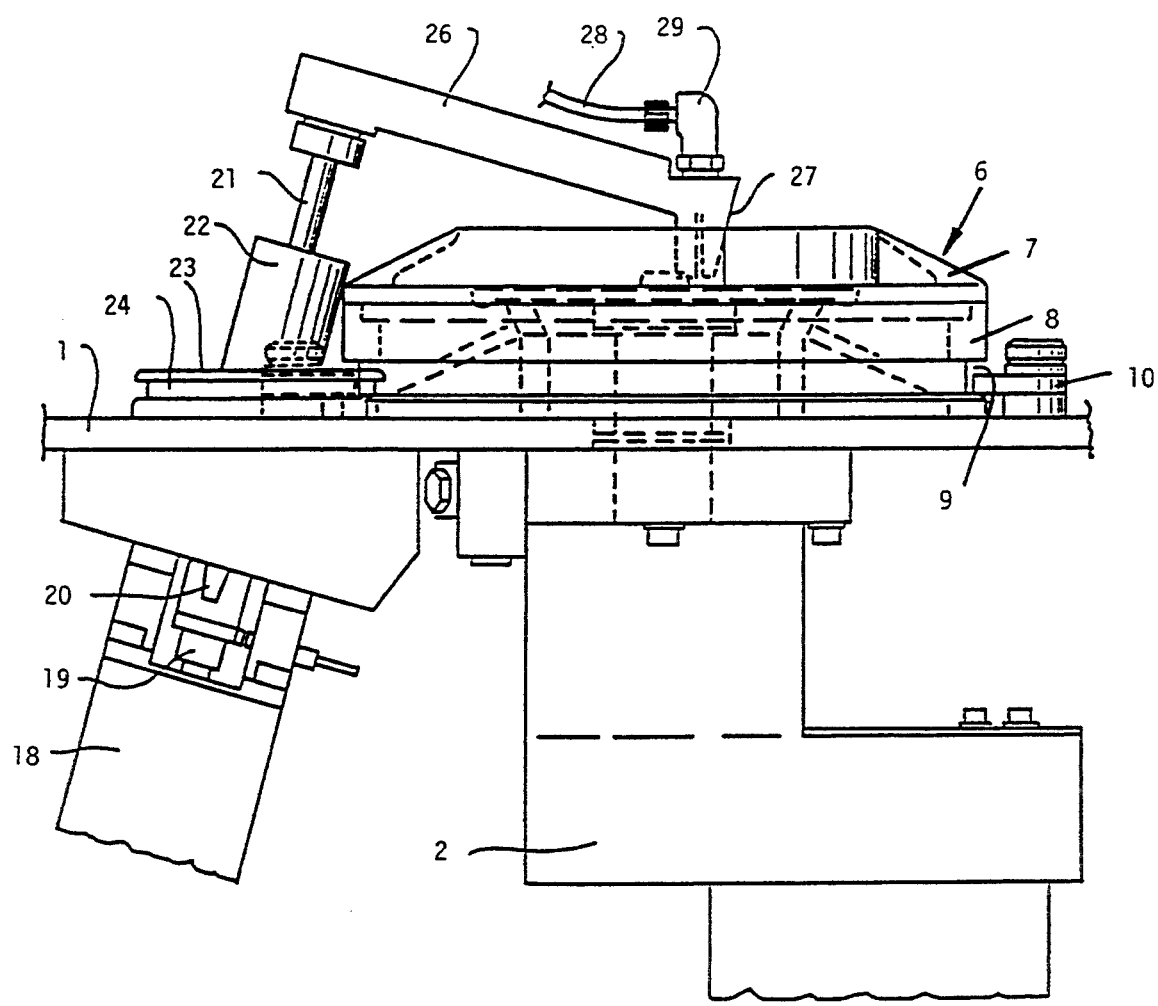
FIG. 2 is a side elevational view of FIG. 1.

As is furthermore apparent, in particular from FIG. 3, the rotary table is disposed in the interior of a cup-shaped means 6, which is built up of two shell-shaped parts 7 and 8. The lower shell-shaped part 8 is provided with a circular groove 9 extending about the periphery thereof. The cup-shaped means 6 may be fixed to the plate 1 by means of eccentric discs 10, each of which are rotatable about their own vertical axes of rotation. Discs 10 are pivotable from a position in which parts of the discs are located within the groove 9, as shown in FIGS. 1 and 2 to a position in which the discs are located outside the groove 9, so that in that case the cup-shaped means 6 can be removed from frame plate 1.

An opening 34 is provided in the upper shell-shaped part for introducing and removing the rgistration carrier 32. As will furthrmore be apparent from FIG. 3, the internal diameter of the shell-shaped part 7 gradually increases in downward direction.

The interior of the cup-shaped means 6 is in open communication with a drain 12 via a drain hole 11 provided in the bottom of the shell-shaped part 8.

A dish-shaped container 13, supported on the outer edge of the shell-shaped part 7, is provided with a spout 14, which extends through the wall of the shell-shaped part 7, in the manner shown in FIG. 3. A pin 15 is provided for the further locking of the dish-shaped container 13. One and of pin 15 fits into a blind bore 16, provided in the bottom side of the dish-shaped container 13, while its bottom end is located within a hole 17 provided in the plate 1.

A pivoting motor 18 is mounted beside the driving mechanism 2, under the plate 1. A shaft 21 can be coupled to the outgoing shaft 19 of pivoting motor 18, via a quick action coupling diagramatically shown at 20. Shaft 21 is journalled in a bushing 22 which is secured to an annular carrier 23, in the circumference of which a circular groove 24 is provided. The annular carrier 23 can be clamped down on the plate 1 by means of eccentric discs 25, which are also rotatable about their own vertical axes from the carrier holding position shown in FIG. 1, in which parts of the eccentric discs 25 engage the groove 24, to a position in which the eccentric discs are entirely located outside the groove.

As will furthermore be apparent from FIG. 2, the axis of rotation of the pivoting motor 18, as well as the central axis of the shaft 21 which is in line therewith, is established at a predetermined angle with respect to a horizontal plane of the plate 1 and a disc-shaped registration carrier 32. The pivot axis formed by the central axis of the motor 18 and the central axis of the shaft 21 slopes upwards in such a manner thereby, that the axis of rotation of the rotary table 3 and the pivot axis of shaft 21 intersect or cross at a point higher than the surface of the rotary table.

An arm 26 is secured to the upper end of the shaft 21. A lacquer supply nozzle 27 is provided at the free end of the arm 26. The lacquer may be supplied to said supply nozzle through a pipe 28, which may be connected to a nipple 29 connected to the supply nozzle 27.

In the position of the arm 26 shown in FIGS. 1 and 2 the bottom end of the supply nozzle 27 is located at a short distance from the registration carrier 5, for example a distance of ±3-4 mm, and near, albeit at a short distance therefrom, the centre of the registration carrier 32. In this position lacquer can be supplied by means of the supply nozzle 27, while the registration carrier 32 rotates slowly, for example making one revolution. It will be apparent that when arm 26 is pivoted into a position over disc or carrier 32 and lacquer is fed a bead of lacquer extending concentrically around the centre of the registration carrier 32 is formed on the upper surface of the registration carrier 32.

Then, as is indicated by means of the arrow "A" in FIG. 1, arm 26 can be pivoted to a position in which the spout 27 is located above the dish-shaped means 13. Any lacquer dripping from the spout or lacquer used for flushing will then be drained from the dish-shaped means 13 via the spout 14 into the interior of the cup-shaped means 6.

It will be apparent that as a result of the above-described sloping position of the pivot axis about which the arm 26 rotates while pivoting from the position shown in FIGS. 1 and 2, the supply nozzle 27 is not only pivoted between a position located above the registration carrier and a position located beside the registration carrier, when seen in plan view, but also moved vertically. This vertical movement is necessary because the bottom end of the supply nozzle must move from the interior of the cup-shaped means through the opening 34. That is, the distance between the upper side of the registration carrier 32 supported on the rotary table 3 and the upper edge of the cup-shaped means 6 is generally ±1 cm or more, in order to prevent any lacquer from splashing out when the registration carrier 32 is rotating fast.

Once the supply nozzle 27 has thus been placed above the dish 13, the rotary table 3 may be rotated at a high number of revolutions by means of the driving mechanism 2, as a result of which the lacquer of the bead of lacquer will move towrds the outside over the surface of the registration carrier 32, so that the lacquer is spread over the registration carrier in an even layer. Any lacquer flung from the registration carrier 32 will be caught by the inner wall of the dish-shaped means 7 and may be drained via the opening 11 and the drain 12.

It will be apparent that as a result of the above-described simultaneous rotary and vertical movement of the supply nozzle, in fact along a sloping path, the adjustment of the supply nozzle between a first position near the axis of rotation of the rotary table 3 and a second position above the dish-shaped means 13, and conversely, may take place very quickly, so that the application of the bead of lacquer and the spreading of the lacquer over the registration carrier may take place in a very short space of time of less than ±4 seconds. As a result of the above-described configuration any lacquer flung from the registration carrier 5 during the faxt rotation of said registration carrier is prevented from splashing outside the cup-shaped means 6. The supply nozzle is also in a position which excludes any risk of splashing lacquer landing on the outer circumference of the supply nozzle.

It should be understood that the above described device, and its method of operation, is in accordance with the principle of the present invention and have been set forth by way of example and illustration, and that various modifications and/or alterations may be made thereto without departing from the spirit and scope of the present invention.

I claim:

1. A device for applying a lacquer coating to a disc-shaped registration carrier, said device including a frame, a rotary table operatively mounted to said frame, a rotary drive to rotate the rotary table about an axis of rotation, said rotary table supporting a disc-shaped registration carrier, and an arm which is pivotally attached to said frame so as to pivot about an upwardly sloping pivot axis, said arm supporting a lacquer supply nozzle and being pivotable so that said nozzle moves between a first position near the axis of rotation of said rotary table and a second position beside said rotary table and at a level, relative to said rotary table, higher than at said first position, said pivot axis extending in such a manner that the pivot axis and the axis of rotation of the rotary table intersect at a point higher than the rotary table.

2. A device as in claim 1, wherein said rotery drive rotates the rotary table at one of a plurality of different speeds.

3. A device according to claim 1, wherein said pivot axis is set at an angle of about ±75° from horizontal.

4. A device according to claim 1, 2 or 3, wherein said arm is secured to a shaft which is detachably coupled to said frame.

5. A device according to claim 4, further including a motor for moving said shaft.

6. A device as in claim 5, wherein said motor is detachably connected to said frame.

* * * * *